United States Patent [19]

Kaune

[11] 3,995,486
[45] Dec. 7, 1976

[54] LIQUID FLOWMETER

[75] Inventor: Manfred Kaune, Wendhausen, Germany

[73] Assignee: Diessel GmbH & Co., Hildesheim, Germany

[22] Filed: Oct. 7, 1974

[21] Appl. No.: 512,857

[30] Foreign Application Priority Data

Oct. 27, 1973 Germany .......................... 2353916

[52] U.S. Cl. ................................................ 73/200
[51] Int. Cl.² ........................................ G01F 15/08
[58] Field of Search ............ 73/200; 137/173, 174, 137/195

[56] References Cited
UNITED STATES PATENTS

| | | | |
|---|---|---|---|
| 2,693,196 | 11/1954 | Hundley | 137/195 |
| 2,703,190 | 3/1955 | Moller | 137/195 X |
| 2,913,068 | 11/1959 | Mistarz | 73/200 X |
| 3,040,573 | 6/1962 | Berck | 73/200 |
| 3,453,205 | 7/1969 | Francis, Jr. et al. | 137/173 |
| 3,481,191 | 12/1969 | List et al. | 73/200 X |
| 3,538,937 | 11/1970 | Diessel | 73/200 X |
| 3,746,027 | 7/1973 | Elliott | 137/529 |

FOREIGN PATENTS OR APPLICATIONS

| | | | |
|---|---|---|---|
| 1,473,059 | 1/1970 | Germany | 73/200 |
| 1,807,512 | 5/1970 | Germany | 73/200 |

*Primary Examiner*—Herbert Goldstein
*Attorney, Agent, or Firm*—Gilbert L. Wells

[57] ABSTRACT

An improvement in the apparatus for flow metering liquids, especially milk, when the liquids are delivered from tank trucks to stationary tanks having a first centrifugal pump, an air eliminator and a volume meter sequentially arranged in that order downstream of the tank truck. The improvement involves locating a second centrifugal pump downstream of the air eliminator which acts as a quantity control pump.

5 Claims, 1 Drawing Figure

U.S. Patent  Dec. 7, 1976  3,995,486
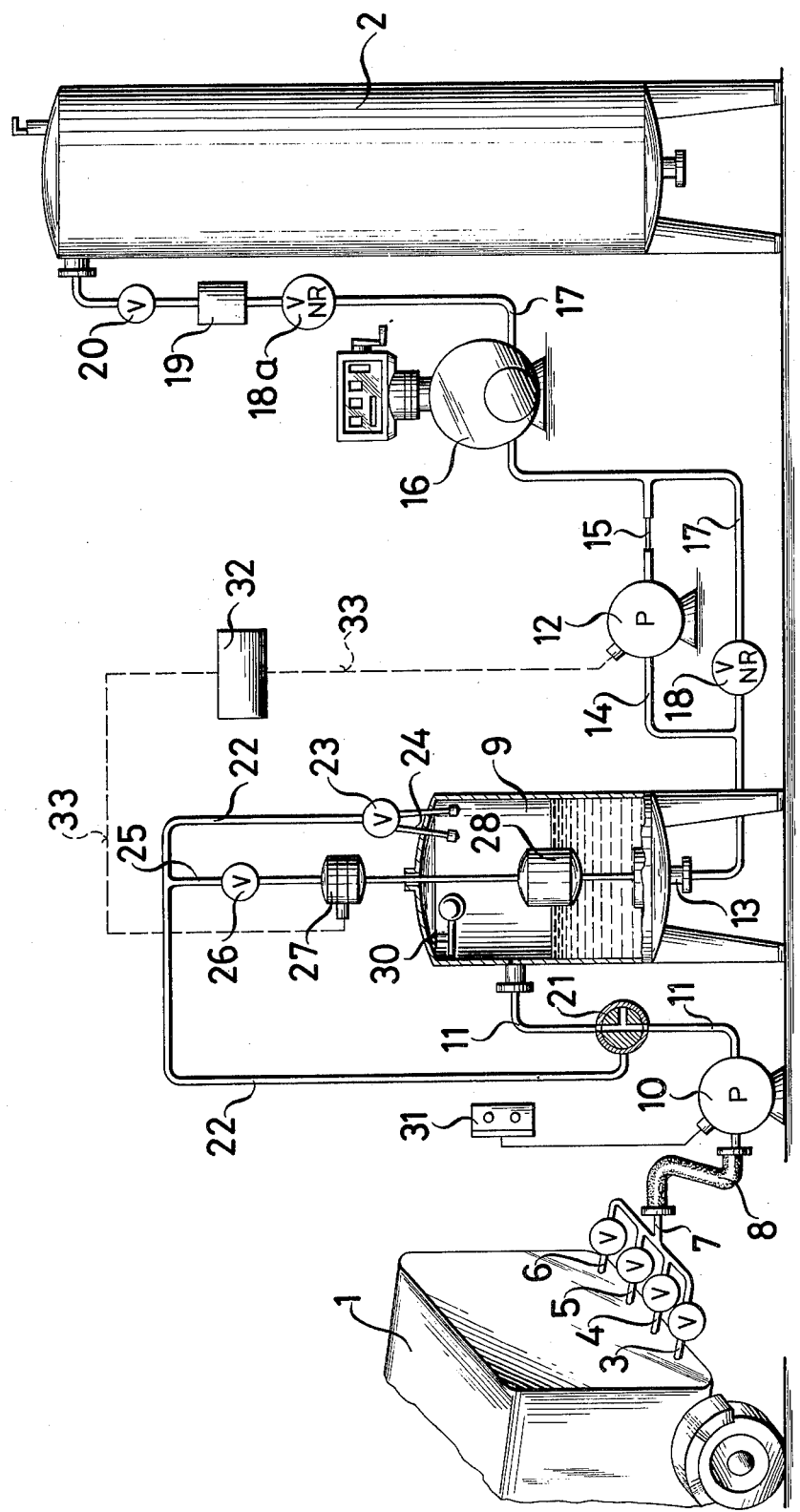

LIQUID FLOWMETER

CROSS REFERENCE TO A RELATED APPLICATION

Applicant claims priority under 35 U.S.C. 119 for Application P 23 53 916.4, filed Oct. 27, 1973 in the Patent Office of the Federal Republic of Germany now West German application No. 23 53 916, published Apr. 30, 1975.

BACKGROUND OF THE INVENTION

The invention relates to a flowmeter for liquids, especially milk, when delivering the same from a tanker vehicle to stationary tanks, a centrifugal pump, an air eliminator and a volume meter being mounted in sequence starting at the tanker truck.

Precise metering of amounts is not feasible with known equipment of this kind because the centrifugal pump moves no air on the pressure side and hence one cannot set the required level for precise quantities at the end of the delivery process in the air eliminator. On the other hand, such equipment advantageously operates with centrifugal pumps because the latter allow large outputs.

The requirement of large output fails to be met therefore by another known kind of equipment, wherein a positive displacement pump, an air eliminator and a volume meter are mounted sequentially, starting with the tank truck. While the positive displacement pump allows sufficiently precise measurement of quantity, it is on the other hand limited as regards output, and may convey no more than 20,000 liters an hour for instance, because beyond a given size of the components of this pump, the required pressure build-up at the end of measurement may no longer be provided for air feed. This known equipment therefore may not be used economically when large deliveries of liquid must be undertaken, and besides, positive displacement pumps are fairly costly.

SUMMARY OF THE INVENTION

Having in mind the limitations of the prior art, it is an object of the present invention to provide equipment of the kind initially mentioned and of such design that while utilizing the large output of a centrifugal pump upstream of the air eliminator, accurate measurement of delivery nevertheless is possible.

This problem is solved by the present invention in that a further centrifugal pump is mounted downstream of the air eliminator so as to act as a flowmeter.

By means of this arrangement, the main and hence the feasible transmission of large amounts will be assumed by the centrifugal pump upstream of the air eliminator, while that downstream from the latter serves merely to maintain the liquid level in the air eliminator. Thereby accurate metering is rendered possible in the presence of the advantageous centrifugal pump.

It is true that a second arrangement is known, wherein an air eliminator, a centrifugal pump and a volume meter are sequentially arranged downstream of the tank truck. The liquid however is fed in free fall in this known equipment from the tank truck to the air eliminator at the stationary tank, the centrifugal pump downstream of the air eliminator conveying the liquid from the latter.

This known arrangement suffers from the drawback of requiring the tank truck to be at a higher level than the air eliminator in order to supply the liquid in free fall, so that for instance, the air eliminator must always be in the cellar of the receiving station. If this is not the case, or proves to be impossible, the liquid may not be fed to the air eliminator, i.e., the tank truck may not be wholly emptied.

Furthermore, as regards this known arrangement, the conveying centrifugal pump will be switched on or off by means of a level indicator, so that this arrangement suffers from the drawback that toward the end of emptying the tank truck or emptying of a first chamber of the same which is nearest the air eliminator, air may be carried into the eliminator and premature shutoff of the centrifugal pump may take place. However, the centrifugal pump will switch on again during resumption of flow of the residual amount, or part of same, so that frequent shutting on and off of the conveying pump will occur during the emptying process. This increases the emptying time and furthermore there is jeopardy of damage to the equipment and especially to the pipes and their connections and to the flowmeter because the frequent shut downs and starts induce pressure pulses.

These drawbacks also are eliminated in the arrangement of the invention, because the conveyance from the tank truck is independent of the drop or gradient between tank truck and air eliminator in view of the centrifugal pump upstream of the air eliminator, whereby furthermore larger outputs of liquids are feasible even when the tank truck is at a lower level than the air eliminator. Only minor amounts of air reaching the air eliminator at the end of measurement because of the use of a centrifugal pump, and single shut-down of the centrifugal pump downstream of the air eliminator is achieved if there is failure to convey by the upstream centrifugal pump, the adverse pressure pulses of the known arrangement no longer will occur. In addition, one obtains better aeration of the residual amount remaining in the air eliminator.

The centrifugal pump downstream of the air eliminator merely serving to maintain the liquid level in the air eliminator, it may be of relatively small output if advantageously mounted in a bypass to the main line.

The arrangement of the present invention furthermore holds the advantage of the centrifugal pump downstream of the air eliminator being of possibly appreciably smaller design than the downstream centrifugal pump of the known equipment, and therefore may be much cheaper.

In order to prevent backflowing of the liquid via the bypass, a throttle means with back pressure valve appropriately will be mounted in series with the downstream centrifugal pump.

In addition to the advantages listed above, the equipment of the invention furthermore allows increasing measurement accuracy. Another advantage of the invention consists in ease of cleaning in the flow condition, a branch line being hooked between the centrifugal pump upstream of the air eliminator and same by means of a switching valve, said branch line leading to the upper part of the air eliminator. A cleaning liquid may be fed to the air eliminator by means of this branch line. In this respect, one may mount at least one spray nozzle in the upper part of the air eliminator, spraying the cleaning liquid, said nozzle being connected to the branch line.

The switching valve may be appropriately switched after an initial period of operation, so that the centrifugal pump upstream of the air eliminator may feed the branch line with the cleaning liquid.

However, it is possible and necessary to supply the cleaning liquid directly via the main line to the air eliminator, therefore a switch with at least one timer is accordingly provided, by means of which the main line to the air eliminator first is loaded with cleaning liquid via the switching valve, upon expiration of a period determined by the timer, the switching valve will be connected to the branch line, whereby the cleaning liquid will be fed to the spray nozzle(s).

Advantageously two timers are provided, the second one determining the time of loading of the branch line with the cleaning liquids.

In order to automate the delivery and cleaning process, a switching system actuated by a floater and for turning off the centrifugal pump downstream of the air eliminator may be provided in the branch line leading to the air eliminator and upstream of same. This switching system may be a contactless switch provided with a viewing pane and calibration marks.

Thus, as regards the apparatus of the invention, the cleaning liquid first will be fed to the centrifugal pump upstream of the air eliminator and operating at full power, through the main of the air eliminator and to the latter, and thereby it is conveyed through the entire equipment, whereupon following switching, all of the cleaning liquid will be conveyed at full power by the centrifugal pump upstream of the air eliminator into the branch line and thereby will be fed to the cleaning nozzle(s) mounted into the upper part of the air eliminator and to the switching system.

BRIEF DESCRIPTION OF THE DRAWING

The invention is best described in further detail by reference to an embodiment of the application shown in the attached FIGURE of the drawing which shows such an embodiment in diagrammatic form.

DESCRIPTION OF THE PREFERRED EMBODIMENT

The liquid to be delivered is supplied from a tank truck 1 to a stationary tank 2. The tank truck of the embodiment shown is provided with several individual chambers, each of which is provided with connectors 3 through 6, these in turn being provided with corresponding manual valves. Connectors 3 through 6 issue into a main line 7 to which is connected a flexible hose 8 which in turn is connected with a centrifugal pump 10 upstream of air eliminator 9 and acting as a conveying pump. Centrifugal pump 10 conveys the liquid via a main line 11 into air eliminator 9 and via lines 13 and 17 into stationary tank 2. Another downstream centrifugal pump 12 is located in a by-pass line 14 provided with a throttle system with back pressure valve 15 in parallel to main line 17 leading to a volume meter 16, said main line also being provided with a back pressure valve 18 in the region of the by-pass. Furthermore, one may mount another back pressure valve 18a, a density indicating instrument 19 and a gate valve 20 in the main line 17 leading from volume meter 16 to tank 2.

A switching valve 21 is mounted in main line 11 between the centrifugal pump 10 upstream of the air eliminator 9 and the latter, a branch line 22 being hooked up to said switching valve and leading to the upper part of air eliminator 9. Said branch line is connected via a gate valve 23 to a spray nozzle 24 mounted in the upper part of air eliminator 9. Another line 25 starts from branch line 22, leading via a gate valve 26 to a switching system 27 provided with a viewing pane, a contactless switch if desired being mounted in said system. The contactless switch is actuated by a float 28 inside air eliminator 9 and serves to turn on or off the centrifugal pump 12 downstream of air eliminator 9.

Air eliminator 9 furthermore houses another float 29 for actuating the ventilation valve 30 of the air eliminator.

Centrifugal pump 10 is actuated by a manual switch box 31; centrifugal pump 12 downstream of air eliminator 9 is actuated by switching 32 shown in block form with at least one timer which may be triggered by the contactless switch in switching system 27.

Operation of the described arrangement is as follows:

Centrifugal pump 10 upstream of air eliminator 9 and manually actuated by manual switch 31 conveys the liquid to be delivered from tank truck 1 via main line 11 independently of the drop or level difference between the tank truck and the air eliminator. Ventilation or evacuation is controlled by float 29. Centrifugal pump 12 downstream of the air eliminator is mounted in by-pass line 14 and of much smaller design if desired than centrifugal pump 10. At the end of delivery, i.e., when pump 10 no longer conveys any liquid into the air eliminator and simultaneously no longer builds up pressure in the air eliminator for the purpose of displacing the liquid held in the air eliminator, the residual amount of liquid is conveyed out of the air eliminator until the contactless switch in switching system 27 is actuated by float 28 and thereby centrifugal pump 12 is shut off by means of line 33. The residual level in the air eliminator is very precisely adjusted in this manner. Shutting down centrifugal pump 10 may take place simultaneously with that of pump 12 in the manner described or manually.

Prior to beginning cleaning, the air eliminator is entirely emptied by means of downstream centrifugal pump 12 itself actuated by hand via switching 32. The apparatus may be hooked up to a cleaning system by means of flexible hose 8, the first timer if desired being triggered by this process. Then centrifugal pump 10 will convey cleaning liquid to air eliminator 9 via main line 11 for the time set at the first timer, and thereby will convey the liquid through the entire apparatus, until the rise of float 28 actuates switching system 27 and turns on pump 12. Turning on pump 12 also effects cleaning of by-pass line 14.

Upon termination of the period set by the first timer, switching valve 21 is switched over and the second timer is actuated, so that henceforth centrifugal pump 10 conveys at full power the cleaning liquid via branch line 22 into the spray nozzle 24 and via branch line 25 into the switching system 27 into air eliminator 9 from above. Upon termination of the period set in the second timer, switching valve 21 is again switched to main line 11.

This control ensures that every cleaning liquid will sufficiently clean both the overall apparatus and also the upper part of air eliminator 9 during every cleaning phase, for instance in the sequence of water-lye-acid-water.

I claim:

1. An apparatus for flow metering and delivering liquids, particularly milk, from first container means to elevated second container means comprising:

a. a first centrifugal pump having an inlet and an outlet with said inlet connected to said first container means;
b. an air eliminator having a bottom, said air eliminator connected to said outlet;
c. a main line conduit connected to said bottom of the air eliminator;
d. a volume meter connected between said main line and said elevated second container means;
e. a by-pass conduit having first and second ends connected into said main line; and
f. a second centrifugal pump having a capacity less than said first centrifugal pump located in said by-pass for maintaining said liquids level in said air eliminator.

2. The apparatus as defined in claim 1, wherein a first back pressure valve is connected in said main line between said first and second ends of the by-pass conduit.

3. The apparatus as defined in claim 2, wherein a throttle system having a second back pressure valve is mounted in said by-pass conduit between said second centrifugal pump and said second end.

4. The apparatus as defined in claim 3, wherein said air eliminator has a float, a switching system actuated by said float and switching system electrically connected to said second centrifugal pump.

5. The apparatus as defined in claim 4, wherein said switching system includes a contactless switch provided with a viewing pane and calibration marks.

* * * * *